US011407915B2

(12) United States Patent
De Saint-Romain et al.

(10) Patent No.: US 11,407,915 B2
(45) Date of Patent: Aug. 9, 2022

(54) INK COMPOSITION FOR CONTINUOUS DEFLECTED JET PRINTING

(75) Inventors: Pierre De Saint-Romain, Valence (FR); Jean-Yves Sabys, La Roche de Glun (FR)

(73) Assignee: MARKEM-IMAJE HOLDING, Bourg-les-Valence (FR)

( * ) Notice: Subject to any disclaimer, the term of this patent is extended or adjusted under 35 U.S.C. 154(b) by 0 days.

(21) Appl. No.: 14/003,142

(22) PCT Filed: Mar. 8, 2012

(86) PCT No.: PCT/EP2012/054025
§ 371 (c)(1),
(2), (4) Date: Nov. 18, 2013

(87) PCT Pub. No.: WO2012/120088
PCT Pub. Date: Sep. 13, 2012

(65) Prior Publication Data
US 2014/0065381 A1    Mar. 6, 2014

Related U.S. Application Data

(60) Provisional application No. 61/495,869, filed on Jun. 10, 2011.

(30) Foreign Application Priority Data

Mar. 9, 2011   (FR) ........................ 1151938

(51) Int. Cl.
C09D 11/00   (2014.01)
C09D 11/52   (2014.01)
C09D 11/30   (2014.01)

(52) U.S. Cl.
CPC .............. *C09D 11/52* (2013.01); *C09D 11/30* (2013.01); *Y10T 428/2481* (2015.01); *Y10T 428/24802* (2015.01); *Y10T 428/24917* (2015.01); *Y10T 428/24926* (2015.01)

(58) Field of Classification Search
CPC . C09D 11/30; C09D 11/52; Y10T 428/24802; Y10T 428/2481; Y10T 428/24926; Y10T 428/24917
See application file for complete search history.

(56) References Cited

U.S. PATENT DOCUMENTS

| 3,994,736 | A | 11/1976 | Hertz et al. |
| 4,024,096 | A | 5/1977 | Wachtel |
| 4,070,322 | A | 1/1978 | Hwang et al. |
| 4,153,593 | A | 5/1979 | Zabiak et al. |
| 4,155,767 | A | 5/1979 | Specht et al. |
| 4,155,895 | A | 5/1979 | Rohowetz et al. |
| 4,166,044 | A | 8/1979 | Germonprez et al. |
| 4,260,531 | A | 4/1981 | Wachtel et al. |
| 4,290,072 | A | 9/1981 | Mansukhani |
| 4,465,800 | A | 8/1984 | Bhatia |
| 4,567,213 | A | 1/1986 | Bhatia et al. |
| 4,680,058 | A | 7/1987 | Shimizu et al. |
| 4,756,758 | A | 7/1988 | Lent et al. |
| 4,834,799 | A | 5/1989 | Song |
| 4,880,465 | A | 11/1989 | Loria et al. |
| 5,102,458 | A | 4/1992 | Lent et al. |
| 5,270,368 | A | 12/1993 | Lent et al. |
| 5,316,575 | A | 5/1994 | Lent et al. |
| 5,395,431 | A | 3/1995 | Siddiqui et al. |
| 5,395,432 | A | 3/1995 | Nelson et al. |
| 5,443,628 | A | 8/1995 | Loria et al. |
| 5,594,044 | A | 1/1997 | Yang |
| 5,598,502 | A | 1/1997 | Takahashi et al. |
| 5,637,139 | A | 6/1997 | Morelos et al. |
| 5,652,286 | A | 7/1997 | Deng et al. |
| 5,693,127 | A | 12/1997 | Nigam et al. |

(Continued)

FOREIGN PATENT DOCUMENTS

| EP | 0 034 881 | 9/1981 |
| EP | 0 289 141 | 11/1988 |

(Continued)

OTHER PUBLICATIONS

Methyl Ethyl Ketone—Solvent Properites, pp. 1-2, no publication date given, obtained online from: http://macro.lsu.edu/HowTo/solvents/MEK.htm.*
Carda-Broch et al, "Solvent Properties of the 1-Butyl-3-methylimidazolium Hexafluorophosphate Ionic Liquid" Anal. Bioanal. Chem vol. 375, pp. 191-199, (2003).*
Shell Chemicals Technical Datasheet—Methyl Ethyl Ketone, pp. 1-3, Mar. 2016.*
Titanium Dioxide Pigment, pp. 1-8.*
Toluene 108883, p. 1.*

(Continued)

*Primary Examiner* — Alexander C Kollias

(74) *Attorney, Agent, or Firm* — Knobbe, Martens, Olson & Bear LLP

(57) ABSTRACT

An ink composition for continuous deflected ink jet printing, liquid at ambient temperature is disclosed. One aspect is an ink composition comprising: a solvent including organic solvent compound(s), and optionally water, the solvent representing at least 20% by weight of the total weight of the ink. Furthermore, there is at least one compound imparting conductivity to the ink composition, chosen from among the ionic liquids, the compound representing 0.2% by weight to 4% by weight of the total weight of the ink composition, preferably 0.5 to 3% by weight of the total weight of the ink composition. Lastly, the ink composition includes less than 10% by weight, preferably less than 5% by weight, more preferably less than 1% by weight, and most preferably 0% by weight of water relative to the total weight of the ink composition.

22 Claims, No Drawings

(56) References Cited

U.S. PATENT DOCUMENTS

| | | | |
|---|---|---|---|
| 5,755,860 A | 5/1998 | Zhu | |
| 5,800,601 A | 9/1998 | Zou et al. | |
| 5,936,027 A | 8/1999 | Zahrobsky et al. | |
| 6,048,388 A | 4/2000 | Schwarz | |
| 6,251,175 B1* | 6/2001 | Zhu et al. | 106/31.58 |
| 7,147,801 B2 | 12/2006 | Kozee et al. | |
| 2002/0001698 A1* | 1/2002 | Blankenship et al. | 428/195 |
| 2004/0154495 A1* | 8/2004 | Zhu | C09D 11/36 106/31.41 |
| 2005/0183628 A1* | 8/2005 | Lchmann | C09D 7/45 106/31.13 |
| 2006/0052493 A1* | 3/2006 | Nagano | C08F 255/00 524/104 |
| 2006/0139426 A1* | 6/2006 | Doi | 347/100 |
| 2008/0000387 A1* | 1/2008 | Renner et al. | 106/31.59 |
| 2008/0209876 A1 | 9/2008 | Miller | |
| 2009/0130308 A1* | 5/2009 | Matsumoto et al. | 427/256 |
| 2009/0317549 A1 | 12/2009 | Tan et al. | |
| 2010/0028632 A1* | 2/2010 | Goustiaux | C09D 11/38 428/209 |
| 2011/0091658 A1* | 4/2011 | Banerjee | G02B 5/0825 427/427.4 |

FOREIGN PATENT DOCUMENTS

| | | |
|---|---|---|
| EP | 0 465 039 | 1/1992 |
| EP | 0 510 752 | 10/1992 |
| EP | 0 735 120 | 10/1996 |
| EP | 0 850 281 | 7/1998 |
| EP | 1 676 894 | 7/2006 |
| EP | 1 858 990 | 11/2007 |
| FR | 2 460 982 | 1/1981 |
| GB | 2 277 094 | 10/1994 |
| GB | 2 286 402 | 8/1995 |
| GB | 2 298 713 | 9/1996 |
| JP | 2006 335995 | 12/2006 |
| JP | 2010 090217 | 4/2010 |
| WO | WO 92/14794 | 9/1992 |
| WO | WO 92/14795 | 9/1992 |
| WO | WO 96/23844 | 8/1993 |
| WO | WO 95/29287 | 11/1995 |
| WO | WO 97/10307 | 3/1997 |
| WO | WO 98/13430 | 4/1998 |
| WO | WO 00/22055 | 4/2000 |
| WO | WO 00/63305 | 10/2000 |
| WO | WO 2006/097502 | 9/2006 |
| WO | WO 2010/103088 | 9/2010 |

OTHER PUBLICATIONS

Chemistry in Alternative Reaction Media, by D.J. Adams, P.J. Dyson, S.J. Taverner, ISBN: 0-471-49849-1—Wiley-VCH. Chapter 4: Ionic Liquids pp. 75-92. 2004.

Ionic Liquids in Synthesis by Peter Wasserscheid, Tom Welton ISBN: 978-3-527-31239-9—Wiley-VCH. Chapter 9: pp. 663-687. 2008.

French Search Report for French Application No. 1151938 dated Nov. 14, 2011.

International Preliminary Report on Patentability for PCT Application No. PCT/EP2012/054025 dated Jul. 1, 2013.

International Search Report for PCT Application No. PCT/EP2012/054025 dated Sep. 28, 2012.

* cited by examiner

INK COMPOSITION FOR CONTINUOUS DEFLECTED JET PRINTING

RELATED APPLICATIONS

This application is a U.S. National Phase of International Application No.: PCT/EP2012/054025, filed Mar. 8, 2012, which claims the benefit of French Patent Application No. 11 51938 filed Mar. 9, 2011, and U.S. Provisional Patent Application No. 61/495,869 filed on Jun. 10, 2011 each of which is incorporated by reference in their entirety.

The invention relates to an ink composition for marking supports, substrates and objects of all types, the properties of which are particularly suitable for liquid jet printing or marking and very particularly for the continuous deflected ink-jet marking of a very large variety of supports, substrates, and objects, whether porous or non-porous.

Inkjet printing is a well known technique, which allows the printing, marking or decoration of all types of objects, at high speed, and without these objects coming into contact with the printing device, with messages that can be varied at will, such as bar codes, sell-by dates, etc., and even on non-planar supports.

Inkjet printing systems can be divided into two main types: "Drop on demand" (DOD) or "continuous jet" (CJ).

We are interested more particularly in the latter technique, more specifically in the continuous deflected jet technique.

Continuous deflected jet spraying consists in sending ink, under pressure, into a cavity containing a piezoelectric crystal, from where the ink escapes via an orifice (nozzle) in the form of a jet. The piezoelectric crystal, vibrating at a given frequency, causes pressure disturbances in the inkjet, which oscillates and gradually breaks up into spherical drops or droplets. An electrode, placed in the path of the jet, where it breaks up, makes it possible to give these drops an electrostatic charge, if the ink is conductive. The drops thus charged are deflected in an electric field and allow the printing.

The drops that are not charged, and therefore are not deflected, are recovered in a gutter, drop collector, where the ink is sucked up, then recycled to the ink circuit.

This type of inkjet spraying provides contactless marking at high throughput speed on objects that are not necessarily planar and with the possibility of changing the message at will. The technique is particularly suited for the marking and identification (expiry dates, serial numbers, batch numbers, bar codes etc.) of industrial products on production lines.

The described field of application requires varied ink formulations, adapted to the variety of substrates to be marked (metal, plastics, glass, etc.) and meeting a large variety of industrial constraints in particular those in which the water-resistance of the marking is of importance.

Ink compositions suitable for continuous deflected jet spraying must satisfy a certain number of criteria inherent in this technique, relating, inter alia, to the viscosity, the electrical conductivity, the solubility in a solvent for cleaning, the compatibility of the ingredients, the correct wetting of the supports to be marked, etc.

Moreover, these inks must dry rapidly, be capable of passing through the nozzle without blocking it, with a high stability of orientation of the jet while at the same time allowing easy cleaning of the print head.

The ingredients that make up current inks, for the inkjet of the continuous deflected jet type, are organic or mineral products; they are dyestuffs, such as dyes or pigments, resins or binders, in one or more solvent(s) that is (are) more or less volatile, or in water, and optionally one or more conductivity salt(s), and also various additives.

The dyestuffs are known as "dyes or pigments" depending on whether they are respectively soluble or insoluble in the solvent used.

The pigments, which are by nature insoluble, are therefore dispersed and may be opaque or non-opaque. They give the ink its colour, its opacity, or specific optical properties, such as fluorescence (see patents or patent applications U.S. Pat. No. 4,153,593, U.S. Pat. Nos. 4,756,758, 4,880,465, EP-A-0 289 141, U.S. Pat. No. 5,395,432, GB-A-2 298 713). In certain cases, the dyes themselves also impart the ink sufficient conductivity for it not to be necessary to add a conductivity salt. The dyes known under the name C.I. Solvent Black 27, 29, 35 and 45 are included in this case.

The binder(s) or resin(s) is (are) generally, for the most part, one (or more) solid and polymeric compound(s) and the choice thereof is dictated by their solubility in the selected solvents and by their compatibility with the dyes and the other additives, but also and especially as a function of the properties that they impart to the film of ink, once dry (see patents or patent applications U.S. Pat. No. 4,834,799, GB-A-2 286 402, U.S. Pat. Nos. 5,594,044, 5,316,575, WO-A-96/23844, WO-A-95/29 287).

Their primary function is to provide the ink with adhesion to the maximum number of supports or to specific supports, for example non-porous supports. They also make it possible to give the ink adequate viscosity for the formation of the drops from the jet and they provide the ink, or rather the marking obtained, with most of its properties of resistance to physical and/or chemical attacks.

The solvent of these inks is constituted, most often, of a mixture comprising, on the one hand, a predominant amount of volatile and not very viscous solvents, in order to make it possible for the markings to dry very rapidly and to adjust the viscosity to the desired value, for example from 2 to 10 mPa·s and, on the other hand, more viscous and less volatile solvents that dry more slowly, in a lesser amount, in order to prevent the ink from drying in the nozzle when the printing machine is shut down (see patents or patent applications U.S. Pat. No. 4,155,767, WO-A-92 14794, WO-A-92 14 795 and U.S. Pat. No. 4,260,531).

The volatile solvents used most often are alcohols, ketones or esters of low molecular weight, as is indicated in U.S. Pat. Nos. 4,567,213 and 5,637,139. Among these solvents, mention may essentially be made of methanol, ethanol, 1-propanol and 2-propanol, acetone, methyl ethyl ketone ("MEK"), and methyl isobutyl ketone.

The less volatile solvents which particularly have a delayed drying function are most often ketones such as cyclohexanone, glycol ethers cited in documents U.S. Pat. Nos. 4,024,096 and 4,567,213, ethers and acetals such as furan or dioxane mentioned in document U.S. Pat. No. 4,155,767, dimethyl formamide or dimethylsulfoxide (U.S. Pat. No. 4,155,895), lactones (EP-A-0 034 881), N-methyl pyrrolidone (EP-A-0 735 120), glycols (WO-A-96 23844), and even aliphatic hydrocarbons (U.S. Pat. No. 4,166,044) or even water, alone or in combination with other solvents cited above; in this respect, reference may be made to documents U.S. Pat. No. 4,153,593, GB-A-2 277 094 and FR-A-2 460 982.

In general, the main or majority predominant solvents in inks intended for deflected continuous jet printing must meet a certain number of criteria, in particular:

their volatility must be sufficient so that the ink dries rapidly on the substrate, support to be marked but not too volatile so that it does not evaporate too quickly in the printer, in particular when printers are not in operation;

their solvent property regarding the binders of the ink, dyes or pigment dispersions and regarding the support to be printed, must allow good adhesion to be imparted to the dry ink;

their effects on the health of persons namely their toxicity, noxiousness, irritant or inflammable nature must be limited;

they must allow an ink, which may optionally be intended to be ingested, to be kept sterile;

finally, they must have the capacity to maintain the ionic species, such as salts, which impart conductivity to the ink, dissolved and dissociated.

The additives comprise dispersants which allow dispersion of pigments, surfactants which modify the wettability or penetrability of the ink (U.S. Pat. No. 5,395,431), in particular those which modify or control the static or dynamic surface tension such as Fluorad® FC 430 from 3M®, agents that inhibit the corrosion induced by the salts providing conductivity (see documents EP-A-0 510 752, U.S. Pat. No. 5,102,458), or else additives that protect the ink against the proliferation of bacteria and of other microorganisms: these are biocides, bactericides, fungicides and the like, which are particularly useful in inks that contain water, pH control buffers (see EP-A-0 735 120), and anti-foaming agents.

The optional conductivity salt(s) provide(s) the ink with the conductivity for the electrostatic deflection. Reference may be made on this subject to document U.S. Pat. No. 4,465,800.

Among the salts which impart conductivity, all kinds of species are used that are ionisable, soluble and may be dissociated in the solvent medium of the ink.

For inks in which the majority, predominant solvent is water, imparting conductivity to the ink does not generally give rise to any problem, since most water-soluble products are ionisable species.

However, an aqueous medium does not allow a large variety of formulations, since the solvent property of water is limited, and the rate of evaporation of water is too slow to benefit from the possibilities of printing at high speed as allowed by ink-jet printing. In addition, the variety of organic solvents with high dissolving power for polymers and dyes allows the formulating of rapid drying inks having excellent adhesion to all kinds of substrates.

On the other hand, in these organic media, conductivity is only possible when the solvents have sufficient dissociating properties i.e. when their dielectric permittivity and dipole moment are sufficiently high. If this is the case, a salt must be found whose cation and anion are sufficiently soluble in the medium.

A large amount of scarcely conductive salt may have a negative effect on the functioning of the printer through clogging of the nozzle when the printer is not in operation (cf. EP-A-0 850 281, page 8, line 21) since these salts have a tendency to crystallize when their concentration is too close to their solubility limit.

Among the salts commonly used are those whose cation is an alkaline metal such as Lithium, Sodium, Potassium (U.S. Pat. No. 3,994,736) or alkaline-earth (U.S. Pat. Nos. 4,070,322, 4,680,058); the salts of ammonium, of tetra-alkyl ammonium e.g. tetrabutylammonium (WO-A-00/63305), of hydroxylamine, dimethylamine (U.S. Pat. No. 4,465,800), of diethylamine or morpholine (U.S. Pat. No. 4,155,767), of the chromophore part of basic dyes (EP-A-0 034 881); and some amine salts (U.S. Pat. No. 4,567,213) or tetra-alkyl phosphonium salts (U.S. Pat. No. 5,755,860) in which the 4 alkyl groups are identical. Among the different types of anions, mention is made of the halides such as chlorides, bromides (U.S. Pat. No. 5,693,127), iodides (U.S. Pat. No. 5,637,139); nitrates; thiocyanates (U.S. Pat. No. 4,024,096); formiates; acetates; propionates; sulfonates such as the para-toluene sulfonates (EP-A-0 034 881) or the trifluoromethane sulfonates (U.S. Pat. No. 6,251,175); tetrafluoroborates (WO-A-00/63305); bicarbonates; citrates; lactates and alginates (U.S. Pat. No. 5,800,601); hydroxides (WO-A-00/22055); sulfates; phosphates (U.S. Pat. No. 5,443,628); hexafluorophosphates; hexafluoroantimonates; the diazonium, iodonium, sulfonium, selenonium, sulfoxonium, or arsonium salts (U.S. Pat. No. 7,147,801).

The choice of salts is guided by:
their capacity to impart conductivity to the ink at the lowest possible level;
their solubility;
their corrosiveness for the constituent metals of printers;
their chemical compatibility/inertia vis-à-vis the other ink components (see EP-A-0 465 039);
their volatility;
their solubility in water which may be desirable or harmful, for example regarding the water resistance of the ink;
their cost per unit of conductivity provided.

Most of the above-cited salts have a certain number of disadvantages, for example:

the halides, fluorides, chlorides and to a lesser extent the bromides and iodides have a very marked corrosive nature, to the extent that anti-corrosion additives are needed to limit the effect thereof. Secondary amines have been claimed in U.S. Pat. No. 5,102,458 (EP-A-0 510 752), and dinonylnaphthalene sulfonates mentioned in document U.S. Pat. No. 5,270,368, in order to limit corrosion;

the salts which are sufficiently soluble in the least polar solvents, such as ketones, are few;

not all the possible salts are compatible with all the ink ingredients, in particular the inorganic salts and notably the inorganic cations such as Na, K, Li, Mg have a mineral nature making them little compatible with the binders such as resins, and the other organic ingredients of the ink;

some cations such as the ammonium ion are volatile and disappear progressively when the ink is re-circulated in printers of continuous inkjet type. The same applies to some acetates and formiates;

the cations of tetra-alkyl ammonium type are of high molecular weight, and on this account they have reduced efficacy per unit of weight. Those with the lowest molecular weight are scarcely soluble in ketones and are of high cost;

the amines such as those added to limit the corrosion caused by some salts are products which react slowly with ketones and are therefore destroyed. They cannot be used in ink formulations containing ketone solvents without the risk of parasitic reactions;

complexing compounds such as crown ethers have been proposed (EP-A-1 858 990) to dissociate and thereby improve the solubilisation of inorganic cation salts such as lithium, sodium or potassium. The cost of such complexing agents may be very high and they do not provide a reliable solution to the problems relating to the crystallization of conductivity salts.

the salts, on account of their ionic nature are generally water-soluble, they make the inks too hydrophilic and reduce the water resistance of the inks;

even if some salts are well dissociated in the medium, their solubility limit may be low and the risks of precipitation are high.

The salts used to date are solids which tend to crystallize easily. The formation of such crystals causes major defects in printers, such as clogging of nozzle filters and of any orifice of small diameter. One fundamental criterion which conductivity salts must meet is therefore the absence of crystallization, precipitation of these salts.

In order to comply with this last, important criterion, lengthy stability studies on complete formulations of inks are needed to verify that no precipitation of these conductivity salts, either alone or in combination with other ink ingredients, takes place over time at all the storage temperatures of inks or at all printer operating temperatures.

It is known that, in general, the solubility of salts at low temperature is reduced and the risks of precipitation or crystallization are increased.

It follows from the foregoing that very few salts simultaneously meet all the above-mentioned criteria and requirements.

In particular, very few salts are at the same time sufficiently dissociated in scarcely dissociating solvent mixtures to provide sufficient conductivity, have little tendency to precipitate or recrystallize, and are water-insoluble.

The goal of the invention is therefore to provide an ink composition suitable in particular for continuous deflected ink jet printing, which inter alia fulfils all the above-indicated needs, which meets the above-mentioned criteria and requirements, which does not have the disadvantages, limitations, defects and shortcomings of prior art ink compositions, and which overcomes the problems of prior art compositions related in particular to the presence of a conductivity salt and more specifically to the nature of the conductivity salts contained in these ink compositions.

This goal and others are achieved according to the invention by an ink composition for continuous deflected ink jet printing that is liquid at ambient (room) temperature, comprising:

a) a solvent comprising, preferably consisting of, one or more (non-aqueous) organic solvent compound(s), and optionally water, the said solvent representing at least 20% by weight of the total weight of the ink;

b) at least one compound imparting conductivity to the ink composition, chosen from among ionic liquids, the said compound representing 0.2% by weight to 4% by weight of the total weight of the ink composition, preferably, 0.5 to 3% by weight of the total weight of the ink composition; and the ink composition comprising less than 10% by weight, preferably less than 5% by weight, more preferably less than 1% by weight and most preferably 0% by weight of water relative to the total weight of the ink composition.

By ambient temperature is generally meant a temperature of 5° C. to 30° C., preferably 10° C. to 25° C., more preferably 15° C. to 24° C., further preferably 20° C. to 23° C. Evidently the ink is liquid at atmospheric pressure.

Advantageously, the ink composition of the invention may further comprise:

c) a binder.

Advantageously, the ink composition of the invention may further comprise:

d) one or more dye(s) and/or pigment(s).

Advantageously, the said ionic liquids are chosen from among salts, ionic liquids whose melting point is 100° C. or lower.

Advantageously, the said ionic liquids are chosen from among salts, ionic liquids which are water-insoluble, i.e. soluble in water by not more than 0.1% by weight at ambient temperature.

Advantageously, the said ionic liquids are chosen from among the non-symmetrical alkyl-imidazolium, alkylpyridinium or aryl-pyridinium or alkyl-phosphonium salts, substituted pyrrolidinium salts or non-symmetrical tetra-alkyl ammonium salts, guanidinium salts and mixtures thereof.

Advantageously the said ionic liquids are chosen from among the triflates, tetrafluoroborates, hexafluorophosphates, paratoluenesulfonates also called tosylates, thiocyanates, bistriflimides (trifluoromethanesulfonylimides), formiates, halides, alkylsulfates, alkylphosphates, alkylsulfonates, methylcarbonates, glycolates, dicyanamides, acetates; of non-symmetrical alkyl-imidazolium, alkylpyridinium or aryl-pyridinium or alkyl-phosphonium, of substituted pyrrolidiniums, or of non-symmetrical tetra-alkyl ammoniums, of guanidinium and mixtures thereof.

The ink composition of the invention differs fundamentally from the prior art ink compositions in that the compounds imparting conductivity to the composition are chosen from the products commonly called ionic liquids.

In the ink composition of the invention, the purpose of the ionic liquid is solely to impart electric conductivity to the ink composition in the liquid state for continuous deflected ink jet printing, and most certainly not any electric conductivity in the dry state in the marking obtained after drying of the ink composition due to evaporation of the solvent and/or absorption of the ink composition in the substrate.

The marking obtained with the ink composition of the invention is generally not conductive.

The marking obtained contains ionic liquid (which does not evaporate on drying) but since this ionic liquid is present in the ink composition of the invention and hence in the marking obtained, in small quantities, it cannot communicate any conductivity to this marking.

In general, the ink composition of the invention does not contain—as compound imparting conductivity to the composition—any conductivity salts such as those commonly used in ink compositions for continuous deflected ink jet printing.

The composition of the invention therefore overcomes the problems related to the use of conductivity salts in the prior art compositions.

Ionic liquids can be defined as liquid salts comprising a cation and an anion. Ionic liquids are therefore generally composed of a voluminous, bulky, organic cation imparting a positive charge thereto, with which an inorganic anion is associated imparting a negative charge thereto.

In general, the cation has a structure that is sufficiently dissymmetrical to prevent crystallization.

In addition, ionic liquids, as their name suggests, and as indicated above, are generally liquid at a temperature of 100° C. or lower, for example in the temperature range of −60° C. to 100° C., and in particular at around ambient, room temperature, and they are often called <<RTILs>> (<<Room Temperature Ionic Liquids>>).

In other words, the name ionic liquid is often and commonly given to all the salts defined above whose melting point is generally 100° C. or lower.

Their volatility is practically zero at ambient temperature on account of their ionic nature.

The books <<Ionic Liquids in Synthesis>> by Peter Wasserscheid, Tom Welton ISBN: 3-527-30515-7—Wiley-VCH and <<Chemistry in Alternative Reaction Media>>, by D. J. Adams, P. J. Dyson, S. J. Taverner, ISBN: 0-471-49849-1—Wiley describe ionic liquids and the uses thereof.

It has been observed that when the ionic liquid is not soluble in water, the water-resistance of the marking obtained is not only maintained but also reinforced through their presence.

By ionic liquid non-soluble in water, water-insoluble, is generally meant that the solubility of this ionic liquid in water is not more than 0.1% by weight (generally measured at ambient temperature and ambient atmospheric pressure).

This increased water-resistance was surprisingly observed more particularly with some resins including phenolic resins of novolac type.

The incorporation of the said compounds, ionic liquids, imparting conductivity to ink compositions, in particular into non-aqueous and volatile ink compositions for continuous deflected ink jet printing, is neither described nor suggested in the prior art.

Ionic liquids are chiefly used as reaction medium to replace conventional solvents, such as extraction solvents, on account of their practically non-existent (quasi-zero) volatility and high solvent (dissolving) and separating power. They are used in particular as battery electrolytes, as cellulose solvents, or reactive gas absorbers. These are fields far removed from the field of ink compositions.

Ionic liquids have been proposed in aqueous inks for ink jet printing of the drop-on-demand type (U.S. Pat. No. 6,048,388).

More specifically, this document concerns an ink composition which comprises water, a dye and an ionic liquid. This composition does not contain any organic solvents.

Ionic liquids have also been proposed as main solvent to replace water, or in combination with water or a solvent (US-A1-2006/0139426 or EP-A1-1 676 894).

This document describes ink compositions comprising at least one dye and an ionic liquid.

In these compositions, the ionic liquid acts as solvent and is not intended to impart any conductivity to the ink.

Such compositions, which generally contain a major amount of ionic liquid, could not be used for applications on non-porous substrates for which the solvent must evaporate rapidly for adhesion to the substrate, since the ionic liquid is not volatile.

Patent application US-A1-2009/0317549 proposes the use of ionic liquids for complexing divalent cations such as calcium.

More specifically, this document describes an essentially aqueous composition comprising a water-soluble salt of a divalent metal, a complexing agent having affinity for the divalent metal such as calcium, and an optical whitening agent.

The complexing agent can be chosen from among numerous families of compounds including ionic liquids.

In the compositions of this document, the ionic liquid acts as a complexing agent of the divalent metal ions in an aqueous medium and is absolutely not intended to impart any conductivity to the composition.

Patent application US-A1-2008/0209876 proposes the use of ionic liquids for dispersing nanoparticles in an organic solvent.

More specifically, this document relates to a solvent composition comprising an organic solvent, dispersed nanoparticles and a non-volatile electrolyte which may be an ionic liquid.

There is no mention in this document that these compositions, which are gelled liquid compositions, are compositions which could be used for continuous deflected ink jet printing.

Patent application US-A1-2006/0139426 proposes the use of an ionic liquid for dissolving dyes for dyeing operations.

More specifically, this document concerns an ink, in particular an ink for ink-jet printing which contains a dye and an ionic liquid.

In this document, the ionic liquid is used in high proportions possibly reaching 95% by weight, it acts essentially as solvent, as vehicle, and is absolutely not intended to impart any conductivity to the composition.

According to the invention, it was ascertained that, surprisingly, ionic liquids incorporated in ink compositions in small quantities, defined by a narrow weight percentage range namely 0.2% by weight to 4% by weight of the total weight of the ink composition, could impart necessary and sufficient conductivity to ink formulations for continuous deflected ink jet printing without compromising the stability of these formulations, and optionally imparting improved water-resistance of markings.

In other words, the incorporation of ionic liquids in a small amount namely from 0.2% by weight to 4% by weight of the total weight of the ink composition, in the inks of the invention, allows the formulating of inks with more varied compositions than with the salts used up until now.

Persons formulating the ink have available a very wide choice of ionic liquids, much less restricted than the choice of salts currently used. On this account, it is therefore possible to impart to the ink all the properties that may be desired which were often impossible to obtain with the salts previously used in ink compositions.

There exists a large variety of ionic liquids which, whilst imparting sufficient conductivity, having little tendency to precipitate or recrystallize like numerous salts, and preferably being water-insoluble, are also able to impart to the ink a whole series of advantageous properties.

If a more precise definition is given of the ionic liquid in the ink composition according to the invention, by <<liquid>> it is generally meant that the ionic liquid is liquid at a temperature equal to or lower than 100° C., for example over a temperature range of −60° C. à 100° C., and that it is notably liquid in the region of ambient temperature namely 15° C. to 30° C., preferably 20° C. to 25° C.

There is no limitation regarding the choice of the $C^+$ cation of the ionic liquid.

Preferably, the $C^+$ cation is chosen from among the organic cations, in particular <<voluminous>>, bulky, organic cations i.e. cations comprising groups known to the man skilled in the art of organic chemistry for having high steric hindrance.

For example, the $C^+$ cation of the ionic liquid can be chosen from among the cations: hydroxonium, oxonium, ammonium, amidinium, phosphonium, uronium, thiouronium, guanidinium, sulfonium, phospholium, phosphorolium, Iodonium, carbonium; heterocyclic cations, and the tautomer forms of these cations.

By heterocyclic cations is meant cations derived from heterocycles compounds i.e. rings comprising one or more hetero-atom(s) generally chosen from among N, O, P and S.

These heterocycles compounds may be saturated, unsaturated or aromatic, and they may also be condensed with one or more other heterocycle(s) and/or one or more other saturated, unsaturated or aromatic carbon ring(s).

In other words, these heterocycles may be monocylic or polycyclic.

These heterocycles may also be substituted by one or more substituent(s) preferably chosen from among the straight-chain or branched alkyl groups with 1 to 20 carbon atoms such as the methyl, ethyl, n-propyl, i-propyl, n-butyl, i-butyl, and t-butyl groups; the cycloalkyl groups with 3 to 7 carbon atoms; the straight-chain or branched alkenyl groups with 1 to 20 carbon atoms; the straight-chain or branched alkynyl groups with 1 to 20 carbon atoms; the aryl groups with to 10 carbon atoms such as the phenyl group; the alkyl-(1 to 20 carbon atoms)-aryl (6 to 10 carbon atoms) groups such as the benzyl group.

The heterocyclic cations may be chosen from among the pyridinium, quinolinium, isoquinolinium, imidazolium, pyrazolium, imidazolinium, triazolium, pyridazinium, pyrimidinium, pyrrolidinium, triazolium, oxazolium, pyrazinium, piperazinium, piperidinium, pyrrolium, pyrizinium, indolium, quinoxalinium, thiomorpholinium, morpholinium and indolinium cations.

These cations possibly being optionally substituted as defined above.

The heterocyclic cations also include the tautomer forms thereof.

Below are given examples of heterocyclic cations which may form the $C^+$ cation of the ionic liquid solvent of the electrolyte according to the invention:

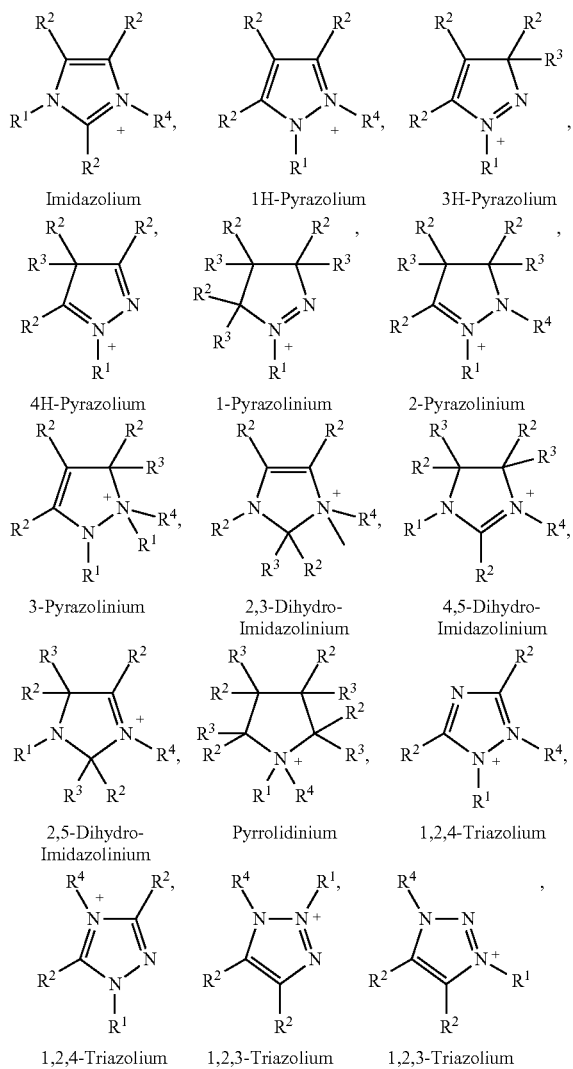

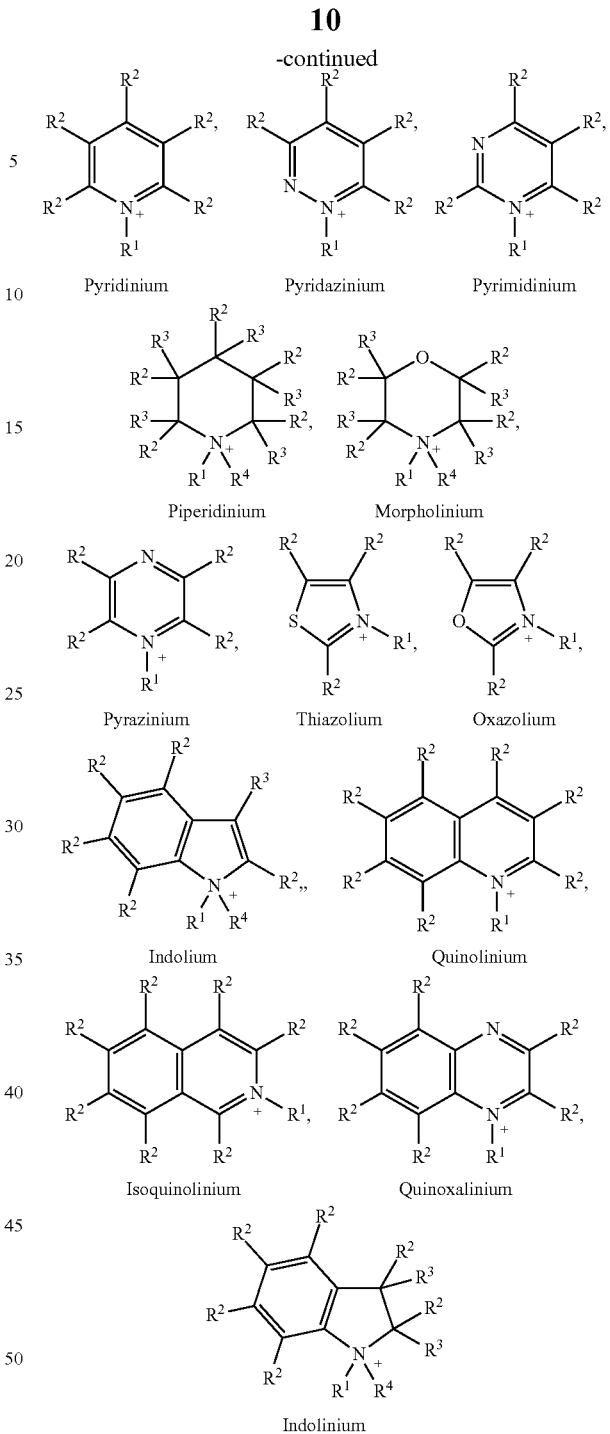

In these formulas, the groups $R^1$, $R^2$, $R^3$ and $R^4$, independently of each other represent a hydrogen atom or a substituent preferably chosen from among the groups already listed above, in particular the straight-chain or branched alkyl groups with 1 to 20 C.

The diversity of the ionic liquids is such that it is possible to use a large number thereof in the ink compositions according to the invention. However, families of ionic liquids are of more interest for use in ink compositions for continuous deflected ink jet printing. These families of ionic liquids are notably defined by the type of $C^+$ cation used, and have been mentioned above.

For example, preferably, the C⁺ cation of the ink composition according to the invention is chosen from among non-substituted or substituted imidazoliums such as di-, tri-, tetra- and penta-alkyl imidazoliums, the quaternary ammoniums, non-substituted or substituted piperidiniums such as dialkylpiperidiniums, non-substituted or substituted pyrrolidiniums such as dialkylpyrrolidiniums, non-substituted or substituted pyrazoliums, dialkylpyrazoliums, non-substituted or substituted pyridiniums such as alkylpyridiniums, the phosphoniums, tetraalkylphosphoniums and sulfoniums such as trialkylsulfoniums.

Preferably the C⁺ cation of the ionic liquid is chosen from the piperidiniums such as the dialkylpiperidiniums, the quaternary ammoniums such as the quaternary ammoniums carrying four alkyl groups, and the imidazoliums such as the di-, tri-, tetra- and penta substituted imidazoliums, for example di-, tri-, tetra- and penta-alkyl imidazoliums.

As already specified above, the alkyl groups generally have 1 to 20 C and may be straight-chain or branched.

Similarly, there is no limitation regarding the choice of the A⁻ anion of the ionic liquid.

Preferably, the A⁻ anion of the ionic liquid may be chosen from among the halides such as Cl—, $BF_4^-$, $B(CN)_4^-$, $CH_3BF_3^-$, $CH_2CHBF_3^-$, $CF_3BF_3^-$, m-$C_nF_{2n+1}BF_3^-$ (where n is an integer such that $1 \leq n \leq 10$), $PF_6^-$, $CF_3CO_2^-$, $CF_3SO_3^-$, $N(SO_2CF_3)_2^-$, $N(COCF_3)$ $(SOCF_3)^-$, $N(CN)_2^-$, $C(CN)_3^-$, $SCN^-$, $SeCN^-$, $CuCl_2^-$ and $AlCl_4^-$.

For example 1-ethyl-3-methylimidazolium thiocyanate may be cited which has a melting point of lower than −20° C.

The sales documents of the companies BASF©, MERCK©, SIGMA-ALDRICH©, CYTEC©, to which reference may be made, give numerous examples of ionic liquids.

Contrary to prior art compositions which contain high quantities of ionic liquids, since these liquids act essentially as solvents, the ink composition of the invention contains a small quantity of ionic liquid(s) defined by a narrow range namely a quantity that is just sufficient to impart the necessary conductivity to the ink, but insufficient to reduce the volatility of the solvents and hamper the drying of the ink.

By sufficient quantity is generally meant a quantity that is sufficient to impart to the composition a conductivity that is equal to or higher than 5 μS/cm, preferably 5 to 5000 μS/cm at 20° C.

Conductivity is measured with a laboratory conductometer, CDM210 model of Radiometer Analytical.

This sufficient quantity of ionic liquid(s), is according to the invention, of at least 0.2% by weight of the total weight of ink, and at most of 4% by weight of the total weight of the ink.

Unlike the compositions of the prior art, the ink composition of the invention also comprises a very small quantity of water of less than 10% by weight, preferably less than 5%, more preferably less than 1% by weight relative to the total weight of the ink.

The ink composition of the invention can even be considered as being essentially free of water (0% water).

In fact, the water that is present is only added water present as an impurity in the various components of the ink. The higher the degree of purity of the chosen components, the lower the water content.

The low content or absence of water in the ink composition of the invention promotes the formation of the film of ink when the binders and other dyes of the composition are water-insoluble, thereby improving the resistance and adhesion properties of the ink.

In the composition of the invention the solvent generally represents at least 20% by weight of the total weight of the ink composition, preferably the solvent represents 30 to 90% by weight, more preferably 60 to 80% by weight of the total weight of the ink composition.

The solvent comprises and preferably consists of one or more organic solvent compound(s) and optionally water provided that the amount of water pays heed to the above-indicated conditions.

Advantageously the said organic solvent compound(s) comprise a majority (predominant) proportion by weight of one or more volatile organic solvent compound(s), and a minority proportion by weight of one or more non-volatile organic solvent compound(s).

Preferably the solvent consists of (is composed of) one or more volatile organic solvent compound(s).

By volatile organic solvent compound is generally meant that this compound has a rate of evaporation of more than 0.5 on the scale at which butyl acetate has a rate of evaporation of 1.

In general, the volatile nature is estimated at ambient atmospheric pressure, namely in general a pressure of one atmosphere, and at ambient temperature such as already defined above.

The said organic solvent compound(s) forming part of the solvent are chosen for example from among alcohols in particular alcohols with low molecular weight, for example aliphatic alcohols such as ethanol; ketones preferably of low molecular weight; the ethers of alkylene glycols; the esters of alkylene glycols and the esters of ethers of alkylene glycols such as the acetates; dimethyl formamide; N-methylpyrrolidone; acetals; esters; straight-chain or cyclic ethers; aliphatic, cyclic or straight-chain hydrocarbons; aromatic hydrocarbons; and the carbonates such as propylene carbonate, ethylene carbonate and dimethyl- and diethyl-carbonates; and mixtures thereof.

Preferably, this or these solvent compounds have the property of dissolving the other ingredients of the ink, in particular the binder, the dye stuffs, additives, etc.

The alcohols are preferably chosen from among straight-chain or branched aliphatic alcohols with 1 to 8 carbon atoms, such as methanol, ethanol, propanol-1, propanol-2, n-butanol, butanol-2, tert-butanol, etc.

The ketones are preferably chosen from among the ketones with 3 to 10 carbon atoms, such as acetone, butanone (methyl-ethyl-ketone), pentanone-2 (methyl-propyl-ketone), methyl-3 butanone-2 (methyl-isopropyl ketone) and methyl-4 pentanone-2 (methyl-isobutyl-ketone).

The ethers of alkylene glycols are preferably chosen from among the mono-alkyl ethers (C1 to C6 alkyl group) or dialkyl ethers (C1 to C6 alkyl groups) of alkylene glycol comprising 1 to 10 carbon atoms in the alkylene chain, preferably they are ethers of ethylene or propylene glycol, such as methoxy-propanol.

The esters of alkylene glycols and the esters of ethers of alkylene glycols are preferably chosen from among the esters thereof with saturated aliphatic, carboxylic acids with 1 to 6 carbon atoms, such as formic acid, acetic acid, propionic acid, butyric acid, valeric acid and caproic acid.

For example, mention may be made of methoxypropyl acetate, butyldiglycol acetate, etc.

The esters are preferably chosen from among the esters of low molecular weight such as the formiates, acetates, propionates or butyrates of alcohols with 1 to 10 carbon atoms.

The acetals are preferably chosen from among the acetals of low molecular weight such as ethylal and methylal.

The ethers are preferably chosen from among the ethers of low molecular weight such as dioxolane or tetrahydrofuran.

The man skilled in the art will easily be able to identify among these solvent compounds those which are volatile and those which are non-volatile.

One preferred solvent according to the invention consists of one or more ketone(s) such as Methyl-Ethyl-Ketone (MEK).

The ink composition of the invention may also comprise a binder comprising one or more polymer(s) and/or resin(s).

These polymer(s) and/or resin(s) are preferably chosen from among the (meth)acrylic, vinylic, ketonic, hydroxyaromatic, cellulosic, styrenic, epoxy resins, the polyurethanes, the styrene-acrylates, the alkoxysilanes, and the combinations of two or more thereof.

Examples of these resins are the following:

For the acrylic, methacrylic and styrene-acrylate resins, the Joncryl® resins by BASF, Paraloid® resins by DOW, SMA® resins by ATOCHEM or Neocryl® resins by DSM.

For the vinylic resins, the Hostaflex® resins by CYTEC, Vinylite® resins by UNION CARBIDE or Vinnol® resins by WACKER.

For the ketonic resins, the products available from HULS and BASF, such as the so-called AP and SK resins by HULS and LAROPAL® resins by BASF.

For the phenolic resins, the products offered by CYTEC under the trade name ALNOVOL®.

Among the cellulosic resins, such as the nitrocelluloses, ethylcelluloses, cellulose aceto-propionates or aceto-butyrates resins, mention may be made of the products offered by AQUALON or EASTMAN.

Among the epoxy resins, the Epikote® resins by SHELL can be cited or the Araldite resins by CIBA.

Among the polyurethanes, mention may be made of the Surkopak® resins by MITCHANOL.

Hydroxyaromatic resins are defined and described in document WO-A-2010/103088 and reference can be made to the description thereof. Preferred resins are the hydroxyphenolic or phenolic resins.

It is specified that by hydroxyphenolic resin or simply phenolic resin is generally meant any polymer comprising phenol OH groups.

Advantageously, the hydroxyphenolic resins may be chosen from among the novolac resins and the polymers of hydroxystyrene.

The resins of novolac type are derived from the polycondensation of a phenol and formaldehyde in the presence of an acid catalyst.

By polymers of hydroxystyrene is meant the homopolymers of hydroxystyrene and the copolymers of hydroxystyrene with other monomers such as the (meth)acrylates.

Said polymers are particularly described in documents WO-A-98/13430 and U.S. Pat. No. 6,251,175 to which reference may be made.

Alkoxysilanes are defined and described in document WO-A-2010/103088 to which reference may be made.

These alkoxysilanes may be aminoalkoxysilanes in particular, which are also defined and described in document WO-A-2010/103088 to which reference may be made.

Advantageously, said aminoalkoxysilane may be chosen from among: gamma-aminopropyltriethoxysilane, gamma-aminopropyltrimethoxysilane, N-(2-aminoethyl)-3-aminopropyl-trimethoxysilane, 3-aminopropylmethyl-diethoxysilane, 3-aminopropyldiisopropylethoxysilane, 3-(1,3-dimethyl butylidene) aminopropyl-triethoxysilane, and bis-(trimethoxysilyl propyl) amine.

One preferred binder according to the invention comprises the combination of at least one alkoxysilane with at least one hydroxyaromatic resin such as a novolac resin.

However, in the composition of the invention, the binder is not obtained by reaction between the alkoxysilane and the hydroxyaromatic resin by heating for example. Since an ionic liquid is used in the ink of the invention, it is not necessary to cause these two compounds to react together e.g. by heating in order to obtain a binder which gives a marking having water-resistance (see Examples 2 and 3), whereas this is necessary with the composition of document WO-A-2010/103088 (see comparative Example 2).

The proportion of binder in the ink composition of the invention is generally from 0.1% to 30% by weight, preferably 1% to 25% by weight, more preferably 3% to 20% by weight of the total weight of the ink composition.

The ink composition may further comprise one or more plasticizer(s) (of the resin(s) or polymer(s) of the binder) chosen for example from among plasticizers known to the man skilled in the art and chosen in relation to the binder used comprising one or more polymer(s) and/or resin(s); as plasticizer mention may be made for example of the thermoplastic polyurethanes, phthalates, adipates, citrates, or the alkyl phosphates.

By means of the widely varying choice of possible solvents for the compositions of the invention, it is easily possible to incorporate said plasticizer compounds in the composition of the invention by choosing the suitable solvent(s).

The plasticizer(s) are generally present in the proportion of at least 0.05% by weight, preferably 0.1% to 20% by weight of the total weight of the ink composition.

The dye(s) and/or pigment(s) may be chosen from among all the dyes and pigments suitable for the intended use, known to the man skilled in the art; some of these pigments or dyes have already been mentioned above.

In general the dyes and pigments may be chosen from among the dyes and pigments known under the name <<C.I. Solvent Dyes>> and <<C.I. Pigments>>.

As examples of the most common pigments and dyes mention may be made of C.I. Solvent Black 29, C. I. Solvent Black 7, C.I. Solvent Black 28, C.I. Solvent Black 27, 35 and 45, C.I. Solvent Blue 70, C. I. Solvent Red 124, the dispersions of Pigment Blue 60 or of Pigment Blue 15.

One preferred dye is C.I. Solvent Black 29.

The total quantity of dye(s) and/or pigment(s) is generally 0.05% to 25% by weight, preferably 1% to 20%, more preferably 3% to 10% by weight of the total weight of the ink composition.

Preferably a dye is chosen having the lowest solubility in water, which is water-insoluble.

By water-insoluble dye is generally meant a dye which, when added at 1% to demineralised water, does not cause colouring of the water that is visible to the eye.

Again, by means of the wide variety of solvents which can be included in the ink composition of the invention, it is possible to choose these solvents so that they are able to dissolve the dye or dyes, and in particular the dyes that have most water-resistance, in larger quantity than in usual solvents; it is particularly possible, with a fluorescent dye to obtain inks that are particularly fluorescent i.e. visible under low UV illumination.

The ink composition of the invention being sprayable by continuous ink-jet, it must have sufficient conductivity, generally equal to or more than 5 µS/cm at 20° C., preferably equal to or more than 300 µS/cm at 20° C., more preferably equal to or more than 500 µS/cm at 20° C.

The conductivity of the ink composition according to the invention may range from 5 to 5000 μS/cm for example, in particular from 500 to 2000 μS/cm (at 20° C.)

The products which impart the necessary conductivity to the ink for continuous deflected ink jet printing, are according to the invention ionic liquids.

However, it is possible that the dye(s) and/or pigment(s) already present in the ink impart some degree of conductivity to the ink composition, which means that it is possible to reduce accordingly the quantity of ionic liquid(s) to be included in the ink composition in order to reach the desired conductivity. Said dyes and/or pigments are especially the compounds known under the name <<C.I. Solvent Black 27, 29, 35 and 45>>, already mentioned above.

When the markings obtained with this composition have to be water resistant, the ionic liquids will be chosen, as already mentioned above, from those which are the most insoluble in water.

The composition according to the invention may, in addition, comprise one or more additives chosen from compounds which improve the solubility of some of its components, the print quality, the adhesion, or else the control of the wetting of the ink on various substrates, supports.

The additive(s) could be chosen, for example, from anti-foaming agents; chemical stabilizers; UV stabilizers; surfactants, such as Fluorad® FC 430 or Byk® 333; agents that inhibit salt corrosion; bactericides, fungicides and biocides; and pH control buffers, etc.

The additive(s) is (are) used in very low doses, in general less than or equal to 5% and sometimes as low as 0.01%, depending on whether they are anti-foaming agents, stabilizers or surfactants.

The invention also relates to a process for marking substrates, supports or objects by spraying an ink onto these substrates, supports or objects by the continuous deflected jet technique, in which the ink sprayed is the ink composition according to the invention, as described in the aforegoing.

The invention also relates to a substrate, support or object provided with a marking obtained by drying and/or absorption (in the support, substrate, object) of the ink composition according to the invention.

This substrate may be made of metal, for example, aluminium or steel; made of glass; made of ceramic; made of a material containing cellulose such as paper, optionally coated or glossy, glazed, enameled paper, cardboard or wood; made of a synthetic polymer ("plastic") especially in the form of films, such as PVCs, PETs, polyolefins such as polyethylenes (PEs), or polypropylenes (PPs); made of polymethylmethacrylate (Plexiglas®); made of fabric; or made of any other non-porous or porous substance; or made from a composite of several of the preceding materials.

This substrate may be porous or non-porous.

This substrate may especially be a container or vessel such as a glass bottle.

Markings, printings of excellent quality are obtained on all substrates, even scarcely porous substrates.

The invention will be better understood on reading the following description of embodiments of the invention given as illustrative, non-limiting examples.

EXAMPLES

The following ink compositions according to the invention were prepared by mixing the products given in Table I below in the indicated proportions. The viscosities and conductivities of the inks obtained are also given below.

The viscosities were measured using a Low-Shear coaxial cylinder viscometer by Contraves (Switzerland) at 20° C., and conductivities were measured at ambient temperature, generally 20° C.

TABLE I

| Examples (weight percentages) | Comparative Example 1 | Comparative Example 2 | N°1 | N°2 | N°3 | N°4 |
|---|---|---|---|---|---|---|
| Methyl ethyl ketone | 64.25 | 72.4 | 64.25 | 69.49 | 70.56 | 70.56 |
| LTH resin by HULS | 2.0 | | 2.0 | | | |
| Resamine HF480 | 13.7 | | 13.7 | | | |
| Solvent Black 29 | 6.15 | 5 | 6.15 | 4.37 | 4.91 | 4.91 |
| Acrylic resin (Joncryl 690 by BASF) | 8.8 | | 8.8 | | | |
| Aminopropyltrimethoxysilane | | 2 | | 1.75 | 1.96 | 1.96 |
| Phenolic resin of novolac type | | 20 | | 22.99 | 19.63 | 19.63 |
| Polyester resin (Reactol 545 by Hexion) | 4.4 | | 4.4 | | | |
| Potassium hexafluorophosphate | 0.6 | 0.5 | | | | |
| 1-butyl-3-methylimidazolium hexafluorophosphate | | | 0.6 | 1.31 | | 2.94 |
| 1-butyl-3-methylimidazolium tetrafluoroborate | | | | | 2.94 | |
| Tegoglide 435 | 0.1 | | 0.1 | | | |
| Byk UV 3500 | | 0.1 | | | | |
| Tegophobe 6000 | | | | 0.09 | | |
| Viscosity (mPa · s) | 5.16 | 4.56 | 5.18 | 4.58 | 5.45 | 5.83 |
| Conductivity (μS/cm) | 705 | 780 | 613 | 716 | 883 | 1218 |

The ink compositions of the invention prepared according to Examples 1 to 4, and also those of comparative Examples 1 and 2, were filtered on filters having a porosity of 1 μm, and gave inks that can be sprayed by ink-jet.

The inks thus prepared were tested on Markem-Imaje® printers of type 9040 which operate according to the principle of continuous deflected ink jet printing.

The markings, printings obtained with the inks of Examples 1 to 4 and comparative Examples 1 and 2 were all of excellent quality and their resistance to rubbing with water on glass was excellent.

However, the resistance of the printing obtained with the ink composition according to the invention of Example 1 was better than the resistance of the printing obtained with the ink of comparative Example 1 which does not contain an ionic liquid.

Also, and contrary to the indication given in document WO-A-2010/103088, the water resistance of the printing obtained with the ink compositions of the invention of Examples 2 and 3 containing an ionic liquid is obtained without heating the complete solution, whereas with the ink of comparative Example 2 it is necessary for the formulation to be heated so that the printing obtained are resistant to rubbing with water on glass.

What is claimed is:

1. A process for marking substrates, supports or objects by spraying an ink onto the substrates, supports or objects by a continuous deflected ink jet technique, wherein the ink is an ink composition for continuous deflected ink jet printing, comprising:
   a solvent consisting of one or more organic solvent compound(s), the solvent representing 30% to 90% by weight of the total weight of the ink;
   a dye that is soluble in the solvent; and
   at least one compound imparting conductivity to the ink composition, wherein the at least one compound is an ionic liquid composed of an organic cation imparting a positive charge thereto, with which an inorganic anion is associated imparting a negative charge thereto, wherein the at least one compound represents 0.2% by weight to 4% by weight of the total weight of the ink composition, and wherein the ionic liquid is a liquid at a temperature of 100° C. or lower;
   wherein the ink composition does not contain water, wherein the ink composition does not comprise a pigment, and wherein the ink composition is a liquid at ambient temperature.

2. The process according to claim 1, the ink composition further comprising a binder.

3. The process according to claim 2, wherein the binder comprises one or more resins or polymers.

4. The process according to claim 3, wherein the resin(s) and/or polymer(s) are selected from the group consisting of (meth)acrylic, vinyl, ketone, hydroxyaromatic, cellulosic, styrenic, epoxy, polyurethanes, styrene acrylates, alkoxysilanes, and the combinations thereof.

5. The process according to claim 4, wherein the hydroxyaromatic resins are selected from the group consisting of hydroxyphenol resins, phenol resins and polymers of hydroxy styrene.

6. The process according to claim 2, the ink composition comprising 0.1% to 30% by weight of the total weight of the ink composition of binder.

7. The process according to claim 1, wherein the ionic liquid is soluble in water to a proportion of not more than 0.1% by weight at ambient temperature.

8. The process according to claim 1, wherein the ionic liquids are selected from the group consisting of non-symmetrical alkyl-imidazolium salts, non-symmetrical alkylpyridinium salts, non-symmetrical aryl-pyridinium salts, non-symmetrical alkyl-phosphonium salts, substituted pyrrolidinium salts, non-symmetrical tetra-alkyl ammonium salts, guanidinium salts, and mixtures thereof.

9. The process according to claim 1, wherein the ionic liquids are selected from the group consisting of triflates, tetrafluoroborates, hexafluorophosphates, tosylates, thiocyanates, bistriflimides, trifluoromethanesulfonylimides, formiates, halides, alkylsulfates, alkylphosphates, alkylsulfonates, methylcarbonates, glycolates, dicyanamides, acetates of non-symmetrical alkyl-imidazolium, acetates of non-symmetrical alkylpyridinium, acetates of nonsymmetrical aryl-pyridinium, acetates of non-symmetrical alkyl-phosphonium, substituted pyrrolidiniums, substituted non-symmetrical tetra-alkyl ammoniums, guanidinium, and mixtures thereof.

10. The process according to claim 1, wherein the organic solvent compound(s) comprise a majority proportion by weight of one or more volatile organic solvent compound(s).

11. The process according to claim 10, wherein the organic solvent compound(s) are selected from the group consisting of alcohols, ketones, ethers of alkylene glycols, esters of alkylene glycols, esters of ethers of alkylene glycols, dimethyl formamide, N methylpyrrolidone, straight-chain or cyclic ethers, acetals, esters, cyclic or straight-chain aliphatic hydrocarbons, aromatic hydrocarbons, carbonates, and mixtures thereof.

12. The process according to claim 10, wherein the organic solvent(s) are selected from the group consisting of straight-chain aliphatic alcohols with 1 to 8 carbon atoms, branched aliphatic alcohols with 1 to 8 carbon atoms, ketones with 3 to 10 carbon atoms; mono alkyl ethers with a C1-6 alkyl group, dialkyl ethers with a C1-6 alkyl group, alkylene glycols with 1 to 10 carbon atoms in the alkylene chain, esters of alkylene glycols, esters of ethers of alkylene glycols with saturated aliphatic, and carboxylic acids with 1 to 6 carbon atoms.

13. The process according to claim 1, the ink composition further comprising one or more plasticizer(s) to the proportion of at least 0.05% by weight of the total weight of the ink composition.

14. The process according to claim 1, wherein the dye is selected from the group consisting of C.I. solvent dyes.

15. The process according to claim 14, wherein the dye is selected from the group consisting of C. I. Solvent Black 29, C. I. Solvent Black 7, C. I. Solvent Black 28, C. I. Solvent Black 27, C. I. Solvent Black 35, C. I. Solvent Black 45, C. I. Solvent Blue 70, and C. I. Solvent Red 124.

16. The process according to claim 1, comprising 0.05% to 25% by weight of dye of the total weight of the ink composition.

17. The process according to claim 1, wherein the conductivity of the ink composition is equal to or more than 5 μS/cm at 20° C.

18. The process according to claim 1, the ink composition further comprising one or more additives selected from the group consisting of anti-foaming agents, chemical stabilizers, UV stabilizers, surfactants, agents inhibiting corrosion by salts, bactericides, fungicides, biocides, and pH control buffers.

19. The process according to claim 1, wherein the at least one compound is about 0.5 to 3% by weight of the total weight of the ink composition.

20. An ink composition for marking substrates, supports or objects by spraying an ink onto the substrates, supports or objects by the continuous deflected ink jet technique, liquid at ambient temperature, wherein the ink of the sprayed ink is an ink composition comprising:
   a solvent consisting of one or more organic solvent compound(s), the solvent representing 30% to 90% by weight of the total weight of the ink;
   a dye that is soluble in the solvent; and
   at least one compound imparting conductivity to the ink composition, wherein the at least one compound is an ionic liquid composed of an organic cation imparting a positive charge thereto, with which an inorganic anion is associated imparting a negative charge thereto, wherein the at least one compound represents 0.2% by weight to 4% by weight of the total weight of the ink composition, and wherein the ionic liquid is a liquid at a temperature of 100° C. or lower;

wherein the ink composition does not contain water, and wherein the ink composition does not comprise a pigment.

21. A substrate, support or object provided with a marking obtained by drying and/or absorption of an ink composition for continuous deflected ink jet printing, liquid at ambient temperature, the ink composition comprising:
- a solvent consisting of one or more organic solvent compound(s), the solvent representing 30% to 90% by weight of the total weight of the ink;
- a dye that is soluble in the solvent; and
- at least one compound imparting conductivity to the ink composition, wherein the at least one compound is an ionic liquid composed of an organic cation imparting a positive charge thereto, with which an inorganic anion is associated imparting a negative charge thereto, wherein the at least one compound represents 0.2% by weight to 4% by weight of the total weight of the ink composition, and wherein the ionic liquid is a liquid at a temperature of 100° C. or lower;

wherein the ink composition does not contain water, and wherein the ink composition does not comprise a pigment.

22. The substrate according to claim 21, wherein the substrate is made of a material selected from a group consisting of metal, glass, ceramic, a cellulose-containing material, a synthetic polymer, polymethylmethacrylate, fabric, and combinations thereof.

* * * * *

UNITED STATES PATENT AND TRADEMARK OFFICE
CERTIFICATE OF CORRECTION

PATENT NO. : 11,407,915 B2  
APPLICATION NO. : 14/003142  
DATED : August 9, 2022  
INVENTOR(S) : Pierre De Saint-Romain et al.

It is certified that error appears in the above-identified patent and that said Letters Patent is hereby corrected as shown below:

On the Title Page

Column 2, Line 1, delete "Properites," and insert --Properties,--.

In the Specification

In Column 1, Line 9 (Approx.), delete "11 51938" and insert --1151938--.

In Column 1, Line 16 (Approx.), delete "ink-jet" and insert --inkjet--.

In Column 4, Line 67, delete "salts." and insert --salts;--.

In Column 6, Line 21, delete "alkylpyridinium" and insert --alkyl-pyridinium--.

In Column 8, Line 66, delete "monocylic" and insert --monocyclic--.

In Column 8, Line 20, delete "ink jet" and insert --inkjet--.

In Column 9, Line 9 (Approx.), after "with" insert --6--.

In Column 9, Line 42-47 (Approx.), delete " 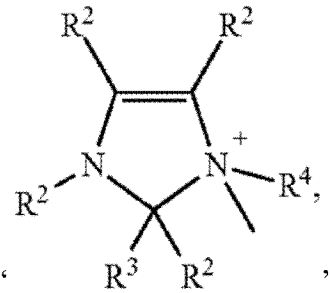 " and insert

Signed and Sealed this  
Third Day of January, 2023

Katherine Kelly Vidal  
*Director of the United States Patent and Trademark Office*

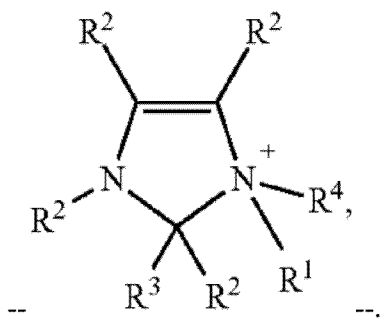

In Column 16, Line 26 (Approx.), after "Low-Shear" insert --30--.

In the Claims

In Column 17, Line 15, In Claim 1, delete "ink jet" and insert --inkjet--.

In Column 17, Line 47, In Claim 5, delete "hydroxy styrene." and insert --hydroxystyrene.--.

In Column 18, Line 1, In Claim 9, delete "alkylpyridinium," and insert --alkyl-pyridinium,--.

In Column 18, Line 2, In Claim 9, delete "nonsymmetrical" and insert --non-symmetrical--.

In Column 18, Line 13, In Claim 11, delete "N methylpyrrolidone," and insert --N-methylpyrrolidone,--.

In Column 18, Line 22, In Claim 12, delete "Cl-6" and insert --C1-6--.

In Column 18, Line 22, In Claim 12, delete "Cl-6" and insert --C1-6--.

In Column 18, Line 55, In Claim 20, delete "ink jet" and insert --inkjet--.